United States Patent
Miyatake

(10) Patent No.: US 7,268,483 B2
(45) Date of Patent: *Sep. 11, 2007

(54) OPTICAL ELEMENT, AS WELL AS POLARIZED-LIGHT-EMITTING SURFACE LIGHT SOURCE AND DISPLAY DEVICE USING THE SAME

(75) Inventor: Minoru Miyatake, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 477 days.

This patent is subject to a terminal disclaimer.

(21) Appl. No.: 10/743,421

(22) Filed: Dec. 23, 2003

(65) Prior Publication Data

US 2004/0135494 A1    Jul. 15, 2004

(30) Foreign Application Priority Data

Dec. 26, 2002 (JP) .............................. 2002-377115

(51) Int. Cl.
   *H05B 33/00* (2006.01)
   *H01J 5/16* (2006.01)

(52) U.S. Cl. ............... 313/501; 313/506; 313/110; 313/112; 27/98; 27/100

(58) Field of Classification Search ................ 359/494, 359/495, 500; 349/69, 96; 313/110, 112
See application file for complete search history.

(56) References Cited

U.S. PATENT DOCUMENTS 3,960,753 A * 6/1976 Larrabee ................. 374/159

6,111,696 A * 8/2000 Allen et al. ................... 349/96
2002/0008807 A1* 1/2002 Miyatake et al. .............. 349/65
2004/0183963 A1* 9/2004 Nakamura et al. ........... 349/69

FOREIGN PATENT DOCUMENTS

| JP | 6-18873 | 1/1994 |
|---|---|---|
| JP | 6-160840 | 6/1994 |
| JP | 6-203963 | 7/1994 |
| JP | 6-265892 | 9/1994 |
| JP | 7-72475 | 3/1995 |
| JP | 7-261122 | 10/1995 |
| JP | 7-270792 | 10/1995 |
| JP | 9-54556 | 2/1997 |
| JP | 9-105933 | 4/1997 |
| JP | 9-138406 | 5/1997 |
| JP | 9-152604 | 6/1997 |

(Continued)

*Primary Examiner*—Mariceli Santiago
(74) *Attorney, Agent, or Firm*—Westerman, Hattori, Daniels & Adrian, LLP.

(57) ABSTRACT

An optical element having a plate-like shape includes a light-transmitting resin and minute regions. The minute regions are dispersedly distributed in the light-transmitting resin and have a birefringence different from the light-transmitting resin. At least one of the light-transmitting resin and the minute regions contains at least one luminescent material. The thus arranged optical element omits the necessity to separately provide a light emitting means made of a light-transmitting resin containing reflective dots or the like as in a conventional manner, while being capable of allowing light, which results from excitation by incident light in the optical element (through the luminescent material), to be emitted to the outside in the form of linearly polarized light having a certain plane of vibration.

9 Claims, 3 Drawing Sheets

FOREIGN PATENT DOCUMENTS

| | | |
|---|---|---|
| JP | 9-293406 | 11/1997 |
| JP | 9-326205 | 12/1997 |
| JP | 10-78581 | 3/1998 |
| JP | 2002-243938 | 8/2002 |
| JP | 2002289925 A * | 10/2002 |
| WO | WO96/19347 | 6/1996 |

* cited by examiner

OPTICAL ELEMENT, AS WELL AS POLARIZED-LIGHT-EMITTING SURFACE LIGHT SOURCE AND DISPLAY DEVICE USING THE SAME

CROSS REFERENCE TO RELATED APPLICATION

This application claims priority from Japanese Patent Application No. 2002-377115, which is incorporated herein by reference.

BACKGROUND OF THE INVENTION

1. Field of the Invention

The present invention relates to an optical element, as well as a polarized-light-emitting surface light source and a display device using the same. Particularly, the present invention relates to an optical element that is capable of allowing light, which results from excitation by incident light, to be emitted through at least one of opposite sides of the optical element in the form of linearly polarized light having a certain plane of vibration, as well as a polarized-light-emitting surface light source using the optical element and a display unit using the polarized-light-emitting surface light source.

2. Discussion of the Background

As a light-guiding plate used in a so-called backlight of a liquid crystal display, a light emitting means, which is made up of a transparent resin plate and high-reflectance pigments such as titanium oxide or barium sulfate contained therein, is known. This light-guiding means emits light through one of the opposite sides of the transparent resin plate by scattering light, which is transmitted in the transparent resin plate upon total internal reflection.

The light emitted from the light-guiding plate having the above arrangement is natural light that exhibits almost no polarization characteristics. Therefore, it is necessary to convert natural light into linearly polarized light via a polarizing plate when it is used for a liquid crystal display. This conversion causes absorption loss of light by the polarizing plate, and hence causes a problem that the utilization rate of light cannot exceed 50%.

In order to address the above problem or achieve increased utilization rate of light, various backlights such as those employing a polarization splitter means that produces linearly polarized light by utilizing a so-called Brewster's angle, or those employing a retardation plate are proposed such as in Japanese Patent Application Laid-open Nos. Hei-6-18873, Hei-6-160840, Hei-6-265892, Hei-7-72475, Hei-7-261122, Hei-7-270792, Hei-9-54556, Hei-9-105933, Hei-9-138406, Hei-9-152604, Hei-9-293406, Hei-9-326205 and Hei-10-78581.

While addressing some problems, those conventional backlights still cannot attain sufficient polarization and are hard to control the polarization direction. As a result, they are of little practical use.

In consideration of the above problems, it is an object of the present invention to provide an optical element that is capable of allowing light, which results from excitation by incident light, to be emitted through at least one of the opposite aides of the optical element in the form of linearly polarized light having a certain plane of vibration, while optionally controlling the polarization direction (plane of vibration), as well as a polarized-light-emitting surface light source and a display device using this optical element.

SUMMARY OF THE INVENTION

To achieve the above objects, there is provided an optical element having a plate-like shape, which includes a light-transmitting resin and minute regions, the minute regions being dispersedly distributed in the light-transmitting resin and having a birefringence different from the light-transmitting resin, wherein at least one of the light-transmitting resin and the minute regions contains at least one luminescent material.

The thus arranged optical element omits the necessity to separately provide a light emitting means made of a light-transmitting resin containing reflective dots or the like as in a conventional manner, while being capable of allowing light, which results from excitation by incident light in the optical element (through the luminescent material), to be emitted to the outside in the form of linearly polarized light having a certain plane of vibration. Also, the optical element of the present invention can optionally set the polarization direction (plane of vibration) of linearly polarized light according to the installation angle of the optical element (according to which direction is designated as a $\Delta n1$ direction (hereinafter described)).

More specifically, most of the light, which light resulting from excitation by excitation light entering the optical element through a lateral side or front or rear side thereof is totally reflected by an air interface according to the refractive index difference between the optical element and air; and transmitted within the optical element. Of the transmitted light, a linearly polarized light component having a plane of vibration parallel to the axial direction (the $\Delta n1$ direction) of the minute regions, along which direction a maximum difference ($\Delta n1$) in refractive index between the minute regions and the transparent resin occurs, is selectively and strongly scattered. Of the scattered light, light scattered at an angle smaller than the total internal reflection angle is emitted from the optical element to the outside (air).

Herein, given that no minute regions are dispersed distributed in the light-transmitting resin, such selective scattering of polarized light does not occur so that, of the light resulting from excitation by the luminescent material in the optical element, about 80% of light is confined within the light-transmitting resin and repeats the total internal reflection on the relationship with the solid angle.

According to the present invention, the light confined within the optical element is emitted to the outside of the optical element only in a case where the total internal reflection condition has been broken due to scattering at the interface between the minute regions and the light-transmitting resin. Thus, it is possible to optionally control the light emission efficiency according to the size of each minute region, distribution ratio of the minute regions or the like.

On the other hand, light scattering at an angle larger than the total internal reflection angle in the $\Delta n1$ direction, light colliding with no minute regions, and light having a plane of vibration in a direction other than the $\Delta n1$ direction each are confined within the optical element and transmitted therethrough as repeating the total internal reflection, thereby eliminating a polarized state by the birefringent phase difference or the like, and allowing light itself to meet the $\Delta n1$ direction condition (that is, turn into linearly polarized light having a plane of vibration parallel to the $\Delta n1$ direction). Accordingly, the light is brought into a state allowing itself to be emitted to the outside of the optical element. These steps are thus repeated, with the result that linearly polarized light having a certain plane of vibration is emitted from the optical element in an efficient manner.

The at least one luminescent material is preferably a fluorescent material that absorbs any one of ultraviolet light and visible light and emits visible light.

Alternatively, the at least one luminescent material may be a phosphorescent material that absorbs any one of ultraviolet light and visible light and emits visible phosphorescence.

Preferably, the minute regions are made of any on of a liquid crystal material, a material in glass state that is formed by fixing a liquid crystal phase upon cooling, and a material that is formed by crosslinking and firing a liquid crystal phase of a liquid crystal monomer upon irradiation of energy rays.

Alternatively, the minute regions may be made of a liquid crystal polymer that has a glass transition temperature of 50° C. or higher and exhibits a nematic liquid crystal phase at a temperature lower than the glass transition temperature of the light-transmitting resin.

In the optical element, preferably the following expressions (1)-(3) are established for refractive index difference between the minute regions and the light-transmitting resin:

$$0.03 \leq \Delta n1 \leq 0.5 \quad (1)$$

$$0 \leq \Delta n2 \leq 0.03 \quad (2)$$

$$0 \leq \Delta n3 \leq 0.03 \quad (3)$$

where, $\Delta n1$: refractive index difference in an axial direction of the minute regions, along which a maximum refractive index difference occurs $\Delta n2$: refractive index difference in an axial direction orthogonal to the axial direction along which the maximum refractive index difference occurs $\Delta n3$: refractive index difference in an axial direction orthogonal to the axial direction along which the maximum refractive index difference occurs.

Also, according to another aspect of the present invention, there is provided a polarized-light-emitting surface light source that includes an optical element having a plate-like shape and a light source that emits light of a wavelength that is capable of exciting a luminescent material contained in the optical element. The optical element includes a light-transmitting resin and minute regions. The minute regions are dispersedly distributed in the light-transmitting resin and have a birefringence different from the light-transmitting resin. At least one of the light-transmitting resin and the minute regions contain at least one luminescent material.

Preferably, the polarized-light-emitting surface light source further includes a light guide member for guiding light emitted from the light source to the optical element, in which the light guide member is made of a translucent material.

The polarized-light-emitting surface light source may comprise an electroluminescence element.

Also, according to still another aspect of the present invention, there is provided a display unit that includes a polarized-light-emitting surface light source that has the above arrangement.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

An embodiment according to the present invention will be hereinafter described with reference to the accompanying drawings.

Figure 1:
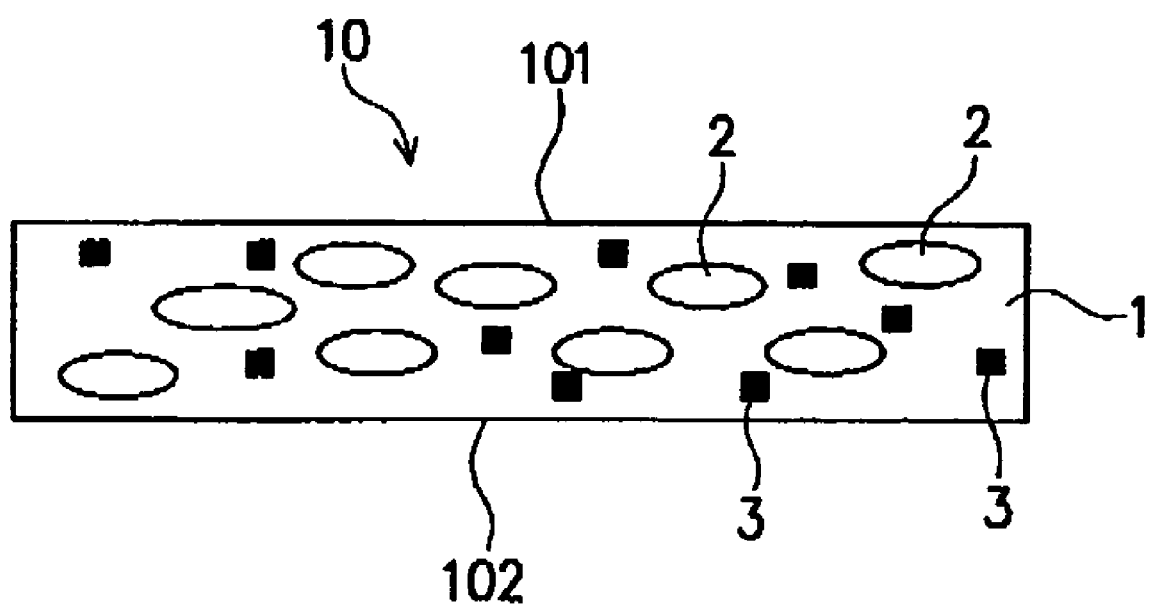
FIG. 1 illustrates a schematic structure of the optical element in vertical cross section, according to one embodiment of the present invention.

FIG. 1 illustrates a schematic structure of the optical element in vertical cross section, according to one embodiment of the present invention. As illustrated in this Figure, an optical element 10 of this embodiment has a light-transmitting resin 1 and minute regions 2 that are dispersedly distributed in the light-transmitting resin 1 and have a birefringence different from the light-transmitting resin 1, and is formed into a plate-like shape. The optical element 10 contains at least one luminescent material 3 in the light transmitting resin 1 and/or the minute regions 2. In FIG. 1, the optical element 10 is illustrated with the luminescent material 3 contained in the light-transmitting resin 1.

The optical element 10 is not necessarily formed into a specific shape, as far as it has two flat sides oppositely located to each other. However, in view of the possibility to apply the optical element 10 to a surface light source, a total internal reflection efficiency and the like, it is preferable to form the optical element into a film-like, sheet-like or plate-like shape having a rectangular cross section. Particularly, the optical element 10 having a plate like shape is advantageous for ease of handling. The optical element 10 has a thickness of preferably 10 mm or smaller, more preferably 0.1 mm-5 mm, and most preferably 0.4 mm-2.0 mm.

The optical element 10 has opposite sides 101, 102, each preferably having a surface smoothness similar to a mirror surface in view of a light confining efficiency that contributes to the ability to confine light, which is formed by the luminescent material 3, within the optical element 10 by the total internal reflection. Where the opposite sides 101, 102 of the optical element 10 have poor surface smoothness, a light-passing film or sheet having excellent surface smoothness may be bonded to the light-transmitting resin 1 via a transparent adhesive 80 as to make the smooth surface of the bonded film or sheet act as a total internal reflection interface. This arrangement also produces the same effect as above.

Preferably, the luminescent material 3 is evenly melted or dispersed into any one or both of the light-transmitting resin 1 and the minute regions 2. Since it is not desirable that the luminescent material 3 causes light scattering, a luminescent material of the type that can be melted is preferably used. Where the luminescent material 3 is dispersed, the dispersion size of the luminescent material 3 is preferably kept as small as possible in order to reduce unnecessary light scattering. The luminescent material 3 may be melted or dispersed by any conventional method, such as by mixing the luminescent material 3 with any one or both of materials respectively forming the light-transmitting resin 1 and the minute regions 2, au well as an additive (optional), prior to forming the optical element 10.

As the luminescent material 3, one or more materials, which absorb ultraviolet light or visible light and, upon excitation, emit light containing wavelength of visible light, can be used without a specific limitation. More specifically, it is possible to use a fluorescent material or phosphorescent material made of an organic dye, inorganic pigment or the like, which respectively cause light emission from the singlet excited state (fluorescence) and light emission from the triplet excited state (phosphorescence).

As the luminescent material 3, materials that respectively emit wavelengths in blue range, green range and red range are used solely or in combination with each other. The description will be made by taking for example the case where the luminescent material 3 is an organic fluorescent dye (blue fluorescent material, green fluorescent material red fluorescent material).

Various organic compounds are preferably used for a blue fluorescent material as far as a resulting material has a fluorescence peak wavelength of 380 nm or more but less than 480 nm in a solution state. Specifically, it is preferable to contain at least one selected from the group comprising a stilbene derivative, distyryl arylene derivative and tristyryl arylene derivative, as disclosed in Japanese Patent Application Laid-open No. Hei-06-203963. It can also be cited as preferable blue fluorescence materials, for example, polynuclear aromatic compounds such as anthracene, perylene and coronene, and their alkyl substituted derivatives.

Various organic compounds are preferably used for a green fluorescent material as far as a resulting material has a fluorescence peak wavelength of 480 nm or more but less than 580 nm. Specifically, it can be cited, as green fluorescents, for example, courmarin compounds such as 3-(2'-benznidolyl)-7-N, N-diethylinocoumarine(coumarin 535), 3-(2-benzothiazolyl)-7-diethylaninocoumarin(coumarin 540), 2,3,6,6-1H, 4H-tetrahydro-8-trifluoromethylquinolizino-<9,9a, 1-gh>coumarin(coumarin 540A), 3-(5-chloro-2-benzothiazolyl)-7-diethylaminocoumarin(coumarin 34), 4-trifluoromethyl-piperidino[3,2-g]coumarin(coumarin 340), N-ethyl-4-trifluoromethyl-piperidino [3,2-g]coumarin (coumarin 355), N-methyl-4-trifluoromethyl-piperidino [2,3-h]coumarin, and 9-cyano-1,2,4,5-3H, 6H,10H-tetrahydro-1-benzopyrano[9,9a1-gh]quinolizine-10-one(courmarin 337), and xanthine dies such as 2,7-dichlorofluorescence, as well as tetracene and quinacridone compounds.

Various organic compounds are preferably used for a red fluorescent material as far as a resulting material has a fluorescence peak wavelength of 580 nm to 650 nm in a solution state. Specifically, it can be cited such as a dicyanomethylenepyran derivative, dicyanomethylenethiopyran derivative, fluorescein derivative and perylene derivative.

These organic compounds must be contained in the range of 0.1 mol % to 10 mol %, preferably 0.5 mol % to 5.0 mol % relative to an organic compound that forms a layer (light-transmitting resin 1 or minute regions 2). Preferably, the luminescent material 3 as used has a stiffness large enough to be tolerable against a fabrication process of the optical element to and prevent deterioration in light emission efficiency under the actual environment.

The optical element 10 can be made by various methods such as by producing an oriented film under an appropriate molecular orientation through a stretching treatment of one or more materials having an excellent transparency such as a polymer and a liquid crystal in such a combination as to form regions having birefringences different from each other. As described above, for the luminescent material 3, a material which can keep the dispersion size as small as possible, is desirable. Therefore, it is preferable that at least one of the combined materials can be well incorporated into the luminescent material 3 to be dispersed.

As examples of the combination of materials, it can be cited a combination of a polymer and a liquid crystal, a combination of an isotropic polymer and an anisotropic polymer, a combination of anisotropic polymers, etc. In order to achieve even distribution of the minute regions 2, the combination enabling phase separation is preferable. Accordingly, the distribution of the minutes regions 2 can be controlled on the basis of the blendability of the combined materials. For example, the phase separation can be achieved by various methods such as by bringing incompatible materials into solution by a solvent, or heat-melting incompatible materials and mixing them together under molten state.

In a case where the molecular orientation is made by subjecting a film to the stretching treatment, the optical element 10 suitable for each application or purpose can be formed by appropriately setting a stretching temperature and stretching ratio for the combination of a polymer and a liquid crystal and a combination of an isotropic polymer and an anisotropic polymer, or by appropriately controlling the stretching conditions for the combination of 6 anisotropic polymers. While anisotropic polymers are classified into positive and negative based on a characteristics of refractive index variation by the stretching direction, any one of positive and negative anisotropic polymers can be used in this embodiment. Accordingly, the combination of positive anisotropic polymers, the combination of negative polymers, the combination of positive and negative polymers are all possible.

As examples of the polymers mentioned above, it can be cited ester polymers such as polyethylene terephthalate and polyethylene naphthalate, styrene polymers such as polystyrene and acrylonitrile-styrene copolymer (AS polymers), define polymers such as polyethylene, polypropylene, polyolefine having cyclo-series or norbornene structure and ethylenepropylene copolymer, acrylic polymers such as polymethylmethacrylate, cellulosic polymers such as cellulose diacetate and cellulose triacetate, and amide polymers such as nylon and aromatic polyamide.

As examples of the transparent polymer mentioned above, it can also be cited carbonate polymer, polyvinyl chloride polymer, imide polymer, sulfone polymer, polyethersulfone, polyetheretherketone, polyphenylene sulfide, vinylalcohol polymer, vinylidene chloride polymer, vinyl butyral polymer, acrylate polymer, polyoxymethylene, silicone polymer, urethane polymer, ether polymer, vinyl acetate polymer or their mixture, and heat- or UV-curing phenolic, melamine, acrylic, urethane, acrylic urethane, epoxy or silicone polymer.

On the other hand, as examples of the liquid crystal as mentioned above, it can be cited low molecular liquid crystals and crosslinked liquid crystal monomers such as cyanobiphenyl, cyanophenyleyclohexane, cyanophenylester, phenylester benzoate or phenylpyrimidine liquid crystal or their mixture, which exhibit a nematic phase or smectic phase at room temperature or high temperature. The crosslinked liquid crystal monomers are usually subjected to a molecular orientation treatment, and then crosslinked into polymers by an appropriate method such as by the application of heat or light.

In order to produce the optical element 10 having an excellent heat resistance and durability, it is preferable to use the combination of a polymer having a glass transition temperature of preferably 50° C. or higher, more preferably 80° C. or higher and most preferably 120° C. or higher and a crosslinked liquid crystal monomer or a liquid crystal monomer. As the liquid crystal polymer, a main-chain or side-chain type polymer or the like is appropriately used without limitation to a specific type. It is preferable that a liquid crystal polymer used has a polymerization degree of preferably 8 or higher, more preferably 10 or higher and most preferably 15 to 5000 since it man contribute to the formation of the minute regions 2 with an excellent homogeneous particle size distribution, as well as having thermal stability, film formability, ease of molecular orientation and the like.

The optical element 10 using a liquid crystal polymer is formed by various methods such as by mixing one or more of polymers with one or more of liquid crystal polymers, which are to form the minute regions 2, thereby forming a polymer film with the liquid polymer dispersedly distributed to occupy the minute regions, and subjecting the polymer film to molecular orientation by a suitable method, thereby forming regions respectively having different birefringences.

Herein, with respect to the refractive index difference between the minute regions 2 and the light-transmitting resin 1, the refractive index difference in an axial direction of the minute regions 2, along which a maximum refractive index difference occurs, is represented by $\Delta n1$, and the refractive index differences in directions respectively orthogonal to the axial direction along which the maximum refractive index difference occurs are respectively represented by $\Delta n2$ and $\Delta n3$. In view of controllability of the refractive index differences by the molecular 6 orientation, the liquid crystal polymer used has preferably a glass transition temperature of 50° C. or higher, and exhibits a nematic phase in a temperature range lower than the glass transition temperature of the polymer simultaneously used in the optical element 10 (the light transmitting resin 1). As an example thereof, it can be cited a side-chain type liquid crystal polymer with a monomer unit represented by the general formula:

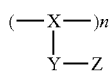

In the above general formula, X represents a backbone group which constitutes the main chain of the liquid crystal polymer, and may be formed by appropriate linkage groups such as linear, branched or cyclic groups. As specific examples thereof, it can be cited polyacrylates, polymethacrylates, poly($\alpha$-haloacrylate)s, poly($\alpha$-cyanoacrylate)s, polyacrylamides, polyacrylonitriles, polyphthacrylonitriles, polyamides, polyesters, polyurethanes, polyethers, polimides and polysiloxanes.

Y represents a spacer group branching from the main chain. As examples of the space group Y to achieve the formidability of the optical element 10 with controlled refractive index difference, it can be cited such as ethylene, propylene, butylenes, pentylene, hexylene, octylene, decylene, undecylene, dodecylene, octadecylene, ethoxyethylene and methoxybutylene. On the other hand, Z represents a mesogenic group which is to impart liquid crystal alignment properties. The side-chain type liquid crystal polymers aligned in nematic orientation may be any appropriate thermoplastic polymers such as homo- or copolymers having monomer units represented by the above general formula. Of them, those having an excellent property in monodomain orientation are preferable.

The optical element 10 using a liquid crystal polymer aligned in nematic orientation may be made of, for example, a method that includes: mixing a polymer, which is to form a polymer film, with a liquid crystal polymer that exhibits a nematic phase in a temperature range lower than the glass transition temperature of this polymer and has a glass transition temperature of preferably 50° C. or higher, more preferably 60° C. or higher and most preferably 70° C. or higher, thereby forming a polymer film with the liquid crystal polymer dispersedly distributed so as to occupy the minute regions 2, heating the liquid crystal polymer, which is to form the minute regions 2, thereby aligning the same in nematic orientation; and fixing this orientation by cooling.

A polymer film (the light-transmitting resin 1) with the minute regions 2 dispersedly distributed therein held in a state prior to the orientation, that is, a film to be oriented may be formed by an appropriate technique such as a casting technique, extrusion molding technique, injection molding technique, roll forming technique, flow casting technique or the like. It is also possible to form a film by spreading a monomer mixture and polymerizing the spread mixture by heating or irradiation with ultra violet rays or the like.

In order to produce the optical element 10 with the minute regions 2 highly evenly distributed therein, a film forming technique such as a casting technique or flow casting technique, in which a solution of a mixture of materials is formed into a film in a solvent, is preferably employed. In such a case, the size and distribution of the minute regions 2 can be controlled by such as changing the type of the solvent, viscosity of the mixture solution or drying speed of a layer formed by spreading the mixture solution. The decrease in viscosity of the mixture solution, increase in drying speed of the mixture-solution spread layer or the like is effective in reducing the area of the minute regions 2.

While the thickness of the film to be oriented is appropriately determined according to needs and circumstances, it is preferably set in the range of 1 μm to 3 mm, more preferably 5 μm to 1 mm, and most preferably 10 μm to 500 μm for ease of orientation. In forming the film, it is possible to incorporate as an additive a dispersant, surfactant, color tone regulator, flame retardant, release agent, antioxidant or the like.

The orientation of the film can be made, for example, by employing one or more techniques capable of controlling the refractive index by the orientation, such as a uni or biaxial, successive biaxial or Z-axis stretching; applying an electric field or magnetic field at a temperature higher than the glass transition temperature or liquid crystal transition temperature and sharply cooling to fix the orientation; flow orientation during film forming process, self-orientation of a liquid crystal on the basis of a slight orientation of an isotropic polymer or any other techniques. Therefore, the optical element 10 produced may be in the form of a stretch film or non-stretched film. For a stretch film, while a fragile polymer may be used, a polymer having an excellent stretchability is preferably used.

In a case where the minute regions 2 are made of a liquid crystal polymer, the orientation can be achieved, for example, by heating a polymer film to such a temperature as to enable a liquid polymer dispersedly distributed therein to exhibit a target liquid crystal phase such as a nematic liquid crystal phase and turn into a molten state, and then applying orientation by the effect of an orientation regulation force and then sharply cooling the film, thereby fixing the orientation. The minute regions 2 are preferably held as close as possible to monodomain orientation in order to prevent fluctuation in optical characteristics or the like.

As the orientation regulation force, a stretching force available in a process of allowing a polymer film to be stretched by an appropriate ratio, a shearing force in a film forming process, an electric field or a magnetic filed, which are all capable of orienting the liquid crystal polymer, is applicable. One or more of these orientation regulation forces may be applied to achieve an appropriate orientation of the liquid crystal polymer.

A region of the optical element 10 other than the minute regions 2, that is, the light-transmitting resin 1 may possess birefringent or isotropic characteristics. The optical element 10, which exhibits birefringent characteristics in its entire region, can be produced by the molecule orientation in the aforesaid film forming process by using a birefringent polymer as a film forming material. According to needs and desires, a known orientation technique such as a stretching technique is applied so that the birefringent characteristics can be controlled or imparted. The optical element 10, in which a region other than the minute regions 2 has isotropic characteristics, can be produced such as by stretching an isotropic polymer as a film forming material in a temperature range lower than its glass transition temperature.

As described above, the light-transmitting resin 1 is different in birefringent characteristics from the minute regions 2. Specifically, as described above, with respect to the refractive index difference between the minute regions 2 and the light-transmitting resin 1, when the refractive index difference of the minute regions 2 in an axial direction (a $\Delta n1$ direction), along which a maximum refractive index difference occurs, is designated as $\Delta n1$, and the refractive index differences in axial directions ($\Delta n2$ and $\Delta n3$ directions) orthogonal to the axial direction, along which the maximum refractive index difference occurs, are respectively designated as $\Delta n2$ and $\Delta n3$, it is preferable to have a relatively large $\Delta n1$, while preferably keeping $\Delta n2$ and $\Delta n3$ as small as possible or as close as possible to 0, in view of the total internal reflection as mentioned below. The optical element 10 of this embodiment is controlled so as to preferably have $0.03 \leq \Delta n1 \leq 0.5$, $0 \leq \Delta n2 \leq 0.03$, $0 \leq \Delta n3 \leq 0.03$, and more preferably $\Delta n2 \Delta n3$. These refractive index differences can be controlled by the refractive index of a material used, a selected orientation technique or the like.

With the refractive index differences $\Delta n1$, $\Delta n2$ and $\Delta n3$ as set above, of the light resulting from excitation by excitation light entering the optical element 10, linearly polarized light in the $\Delta n1$ direction is strongly scattered at an angle smaller than an critical angle (a total internal reflection angle) so that the quantity of light emitted from the optical element 10 to the outside can be increased, while linearly polarized light in directions other than the $\Delta n1$ direction is hard to be scattered, thus repeating the total internal reflection. As a result, the linearly polarized light in directions other than the $\Delta n1$ direction can be confined to the inside of the optical element 10.

The refractive index difference between each of the axial directions ($\Delta n1$, $\Delta n2$ and $\Delta n3$) of the minute regions 2 and the light-transmitting resin 1 represents the average refractive index difference between the respective axial directions of the minute regions 2 and the light-transmitting resin 1 for the light-transmitting resin 1 having optically isotropic characteristics, and, for the light-transmitting resin 1 having optically anisotropic characteristics, represents the refractive index difference in each axial direction, since the direction of the principal light axis of the light-transmitting resin 1 is usually identical with the direction of the principal light axis of the minute regions 2.

Since the $\Delta n1$ direction is parallel to a plane of vibration of linearly polarized light emitted from the optical element 10, the $\Delta n1$ direction is preferably parallel to the opposite sides 101, 102 of the optical element 10. As fir as the $\Delta n1$ direction is parallel to these opposite sides 101, 102, it may be any direction suitable for a liquid crystal cell or the like to which the optical element 10 is applied. In order to obtain a higher homogeneity of the scattering effect or the like in the minute regions 2, it is preferable to have the minute regions 2 dispersedly distributed as evenly as possible in the optical element 10. The size of each minute region 2, particularly the length in the scattering direction, i.e., the $\Delta n1$ direction affects backscattering (backreflection) or wavelength dependency. In order to improve the light utilization efficiency, prevent coloration due to the wavelength dependency, prevent deterioration in visual recognition due to visualization of the minute regions 2 or deterioration in clear display, or obtain an improved film formability or film strength, the size of each minute region 2, particularly the length in the $\Delta n1$ direction is preferably in the range of 0.05 μm to 500 μm, more preferably 0.1 μm to 250 μm and most preferably 1 μm to 100 μm. The minute regions 2, which usually exist in the optical element 10 in a domain state, may have a varying length in the $\Delta n2$ direction or the like without limitation to a specific length in its direction.

While the ratio of the minute regions 2 occupying the inside of the optical element 10 may be appropriately determined in consideration of the scattering characteristics in the $\Delta n1$ direction or the like, it is set to preferably 0.1 wt. % to 70 wt. %, more preferably 0.5 wt. % to 50 wt. % and most preferably 1 wt. % to 30 wt. %.

Figure 2:
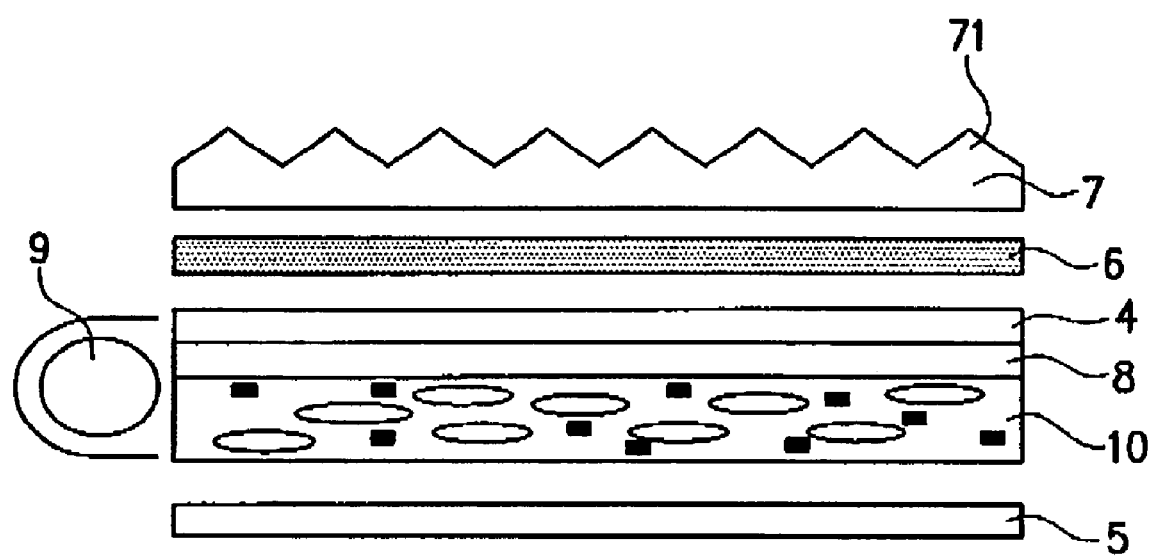
FIG. 2 illustrates a schematic structure of the polarized light-emitting surface light source, to which the optical element of FIG. 1 has been applied.
Figure 3:
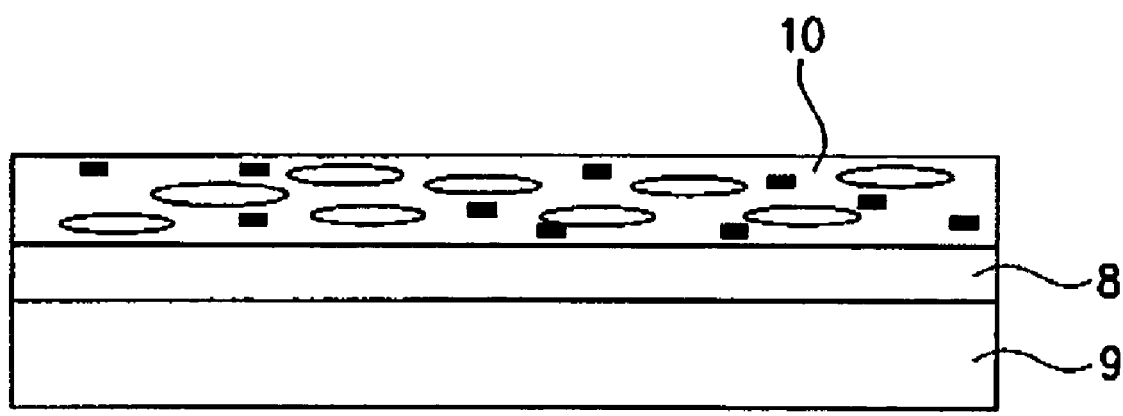
FIG. 3 partially illustrates a schematic structure of the polarized-light-emitting surface light source in a case where a different excitation light source in used.

The optical element 10 of this embodiment can form a polarized-light-emitting surface light source in combination with a light source that emits light having a wavelength capable of exciting the luminescent material 3 contained in the optical element 10. While the arrangement of the light source and the optical element 10 is not necessarily limited to a specific one, it is desirable to employ an arrangement allowing excitation light to effectively enter the optical element 10. For this, as illustrated in FIG. 2, it is preferable to employ an arrangement with an excitation light source 9 located on a lateral side of the optical element 10, or an arrangement where the excitation light source 9 is a surface light source such as an electroluminescence element and one of the flat sides of the optical element 10 is positioned opposite to an upper side of the surface light source, as illustrated in FIG. 3. The optical element 10 may be independently arranged as illustrated in FIG. 2, or arranged integral with the excitation light source 9 and/or a light passing support member via a light passing adhesive layer. For producing a more efficient result, a light guiding plate for guiding light from the excitation light source into the optical element 10 is preferably provided. Various types of light guiding plates can be used for this, while those having a flat plate shape or wedge shape made of a light passing resin, or those made of a light passing resin containing reflective dots are preferably used.

The optical element 10 in this embodiment may be formed with a single layer, or two ore more layers bonded together. The optical element made through such a multi-layer structure or superimposition can exhibit a scattering effect which is synergized or enhanced to such a degree higher than an effect resulting from only increase in thickness. The layers are preferably superimposed to each other in such a manner as to have the $\Delta n1$ directions parallel to each other. The number of layers superimposed is two or more so as to be appropriately adapted to each case.

The optical element 10 with layers superimposed may have the Δn1, Δn2 and Δn3 directions identical or different in each layer. Also, the luminescent material 3 contained in the optical element 10 may be made of the same or different materials. The layers are preferably superimposed to each other in such a manner as to have a parallel relationship in the Δn1 direction, while misalignment of the layers due to operational errors or the like is acceptable to some extent. When the fluctuation of the Δn1 direction or the like occurs between the layers, these layers are preferably set with their average directions to have a parallel relationship with each other.

A layered structure of the optical element 10 in combination with a light source, a support member, a light guiding plate or the like, or a layered structure of plural optical elements 10 is made by bonding them together via an adhesive layer so as to make a total internal reflection interface serve as an outermost surface of a layered structure. As an adhesive layer, a hot melt adhesive, pressure sensitive or any other type adhesive may be used. In order to limit reflection loss, an adhesive layer having a small refractive index difference with respect to the optical element 10 is preferably used. The bonding may be also made by using a resin for forming the light passing resin 1 or the minutes regions 2. As the adhesive, for example, various types of a transparent adhesive such as acrylic, silicone, polyester, polyurethane, polyether or rubber adhesive can be appropriately used according to needs and circumstances, while it is preferable to use an adhesive that does not require application of high temperature for curing or drying, or does not require a long time for curing or drying, in order to prevent changes in optical characteristics or the like. Also, a resin that is unlikely to cause a so-called delamination phenomenon such as layer-lifting or layer-peeling under a specific heating or humidification condition is preferable.

Therefore, as the adhesive used, it is preferable to use such as an acrylic adhesive with acrylic polymer as the base polymer having a weight-average molecular weight of 100.000 or more, resulting from copolymerization of alkyl-ester-methacrylate having alkyl groups containing 20 or less carbon atoms such as methyl group, ethyl group or butyl group with acrylic monomer comprising a modified ingredient such as methacrylic acid or hydroxyethyl methacrylate, in such a combination as to have a glass transition temperature of 0° C. or lower. The acrylic adhesive has an advantage in transparency, weather resistance, heat resistance and the like.

The adhesive layer may be attached to the optical element 10 by any method appropriate to each case, such as by melting or dispersing adhesive ingredients into a solvent made of any one of toluene, ethyl acetate and the like, or mixture thereof, thereby preparing an adhesive solution of about 10 wt. % to 40 wt. % and directly applying the adhesive solution on the optical element 10 by a suitable spreading technique such as a flow-casting or coating technique, or by forming an adhesive layer on a separator following the former steps and transferring the adhesive layer onto the optical element 10. The adhesive layer as attached can be formed in layered structure having different compositions or types.

The thickness of the adhesive layer is appropriately set according to adhesive power or the like, while it is generally set in the range of 1 μM to 500 μm. It is also possible to appropriately mix an additive such as a natural resin, synthetic resin, glass fibers, glass beads, filler made of metal powder or other inorganic powder, pigment, coloring agent, or oxidation inhibitor in the adhesive layer according to needs and circumstances.

In the example illustrated in FIG. 2, a light passing shoot 4 having an excellent smoothness is bonded on the optical element 10 via an adhesive layer 8 as described above, in which a smooth surface (an upper side) of the light passing sheet 4 bonded serves as a total internal reflecting interface.

The optical element 10 is preferably structured so as to entirely or partially have a phase difference in view of the necessity to appropriately eliminate a polarized state during light transmits through the optical element 10. Basically, the slow axis (the axis in the Δn1 direction) of the optical element 10 has a orthogonal relationship with the polarization axis (plane of vibration) of the linearly polarized light, along which light is hard to be scattered, and therefore polarization conversion due to phase difference is hard to occur. However, it is assumed that slight scattering causes changes in apparent angle and hence causes polarization conversion.

From the point of view of causing the polarization conversion, the optical element 10 is preferably formed with a phase difference between in-plane directions of 5 nm or greater in a general application, while this phase difference may be varied according to the thickness of the optical element 10. This phase difference can be given by employing various techniques, such as by containing birefringent fine particles in the optical element 10 or attaching the same on the optical element 10, by giving the birefringent characteristics to the light-transmitting resin 1, by employing these techniques in combination, or by forming birefringent films into integral laminate structure.

In order to allow the optical element 10 to efficiently emit polarized light through one of the front and rear sides thereof in the polarized-light-emitting surface light source, to which the optical element 10 of this embodiment is applied, a reflection layer 5 is preferably located as illustrated in FIG. 2. In the example as illustrated in FIG. 2, the reflection layer 5 is located on the rear aide (lower side) of the optical element 10, so that light emitted through the rear side of the optical element 101 is reversed via the reflection layer 5 without change in a polarized state and the thus emitted light is concentrated on the surface of the optical element 10. Whereby, the luminance of the optical element 10 can be enhanced.

The reflection layer 5 preferably has a mirror surface in order to sustain the polarized state. For this purpose, it is preferable to form the reflection layer 5 with a reflection surface made of a metal or dielectric multilayer film. As the metal, aluminum, silver, chrome, gold, copper, tin, zinc, indium, palladium or platinum, or their alloy can be appropriately used.

The reflection layer 5 may be directly brought into tight contact with the optical element 10 as an attached layer of a metal thin film by vapor deposition, but is hard to produce perfect reflection and hence causes slight absorption by the reflection layer 5. Accordingly, in view of the fact that the total internal reflection of the light transmitting in the optical element 10 is repeated, the tight contact of the reflection layer 5 to the optical element 10 may cause absorption lose. In order to prevent this absorption loss, it is preferable to only overlay the reflection layer 5 on the optical element 10, allowing air to be interposed between.

Accordingly, as the reflection layer 5, it is preferable to use a reflection plate having a substrate with a metal thin film attached thereon by sputtering or vapor deposition, or a plate-like member such as paillon or rolled metal sheet. As the substrate, it is possible to appropriately use a glass plate, resin sheet or the like. Particularly, the reflection layer 5 is preferably formed by vapor deposition of silver, aluminum or the like on a resin sheet in view of refractive index, hue, handling property or the like.

On the other hand, as the reflection layer 5 made of a dielectric multilayer film, a film disclosed such as in a published Japanese translation of a PCT application (Publication No. Hei-10-511322) can be appropriately used.

In addition to the arrangement with the reflection layer 5 located on the rear side of the optical element 10 as illustrated in FIG. 2, it is possible to locate the reflection layer 5 anywhere such as on the front side or lateral side of the optical element 10, or for the arrangement with a light guide plate, on the front, rear or lateral side thereof, or any other place appropriate to each case.

As illustrated in FIG. 2, in the polarized-light-emitting surface light source to which the optical element 10 is applied, a lens sheet 7, a light diffusion layer 6 or the like may be located on a light retrieving side (upper side) of the optical element 10. Also, it is possible to appropriately locate a wavelength cut filter (not shown) or a retardation film (not shown) according to needs and circumstances.

The lens sheet 7 is provided such as to control optical path of the light (linearly polarized light) emitted from the optical element 10, while maintaining its polarization, so as to improve the directivity toward the front side, which is advantageous in visual recognition characteristics and allow the emitted light having scattering characteristics to have an intensity peak on the front side.

As the lens sheet 7, any type of lens sheet may be used as far as it is capable of controlling the optical path of the scattered light entered through one of the opposite sides (rear side) of the optical element 10 and efficiently emitting the light through the other side (front side) in a direction orthogonal to the sheet surface (in the front direction). Therefore, except for the polarization-maintaining characteristics, it is possible to use any lens sheet having a varying lens form, as disclosed in Japanese Patent Application Laid-open No. 5-169015, which is used in a conventional, so-called sidelight-type light guide plate.

As the lens sheet 7, it is preferable to use a lens sheet having an excellent transmittivity such as with a total transmittance of the light being preferably 80% or higher, more preferably 85% or higher and most preferably 90% or higher, and with a transmittance of the light leaked as a result of eliminating the polarization being preferably 5% or lower, more preferably 2% or lower and most preferably 1% or lower in a case where the lens is set in a cross-Nicol position, as well as enabling emission of light still possessing the polarization characteristics.

In general, the elimination of the polarization is caused by birefringence, multiple scattering or the like, and therefore the lens sheet 7 exhibiting the polarization-maintaining characteristics can be achieved such as by reducing the birefringence, or reducing an average number of reflections (scatterings) of light transmitting in the lens. Specifically, it is possible to prepare the lens sheet 7 with the polarization-maintaining characteristics such as by using one or more of resins having small birefringence characteristics (resins having an excellent 6 isotropic characteristics) such as cellulose triacetate, poly(methyl methacrylate), polycarbonate, norbornene resin or the like cited as a polymer used for the optical element 10.

The lens sheet 7 may be of various lens forms such as a lens form with a large number of lens regions (particularly minute lens regions) of a convex lens type or a 01 type refractive index distribution, made of a transparent resin substrate, which may contain a resin having a different refractive index, and photopolymer placed on or inside of the resin substrate so that a refractive index is controlled through the photopolymer, a lens form with a lens region made of a transparent resin substrate formed with a large number of through-holes in which a polymer having a different refractive index is filled, a lens form with a large number of spherical lenses arranged in a single layer and fixed within a thin film, or any other lens form according to needs and circumstances. However, in view of the optical path control by setting different refractive indexes or other conditions, it is preferable to use, as the lens sheet 7, a lens sheet having an irregular surface structure that forms a corrugated lens configuration 71.

The irregular surface structure, which forms the lens configuration 71, may be varied, as far as it can control the path of light, which has been transmitted through the lens sheet 7, so as to concentrate the transmitted light towards the front side. Accordingly, the irregular surface structure may have a large number of linear grooves having triangular cross section and protrusions alternately aligned parallel or arranged in lattice pattern, or a large number of minute protrusions each having a bottom of a triangular-pyramid, quadrangular-pyramid, or polygonal-pyramid vertex, which are arranged in dot patterns. The irregular surface structure in a linear or dot pattern may be a spherical lens, aspheric lens, half-round lens or the like.

The lens sheet 7 having an irregular surface structure in a linear or dot pattern can be formed by an appropriate method such as by filling a resin solution or resin-forming monomer into a mold having a molding surface conformed to create a predetermined irregular structure, optionally subjecting the filled solution or monomer to polymerization according to needs and circumstances and then transferring the molded irregular structure onto a target surface, or by heating a resin sheet and pressing the same into the aforesaid mold and transferring the irregular surface structure onto a target surface. The lens sheet 7 may be of a layered structure with two or more resin layers of the same or different types, such as a lens sheet made of a substrate sheet to which a lens form is applied.

One or more lens sheets 7 may be located on the light-emitting side of the optical element 10. In a case where two lens sheets 7 are located, they may be of the same type as each other or different types from each other, while it is preferable to exhibit the polarization-maintaining characteristics throughout the entirety thereof. In a case where the lens sheet 7 is located in proximity with the optical element 10, the lens sheet 7 is preferably located with a clearance to the optical element 10, that is, to have an air layer interposed therebetween, in the same manner as in the case of the reflection layer 5. It is preferable that the clearance is sufficiently greater than a wavelength of the incident light.

In a case where the lens form of the lens sheet 7 has an irregular surface structure in linear pattern, it is preferable to locate the lens sheet 7 so as to allow the linearly aligned members (grooves and ridges) of the irregular surface structure to be oriented parallel or orthogonal to the optical ax direction of the optical element 10 (a direction of the plane of vibration of the emitted polarized light) in order to provide appropriate control of the optical path towards the front side. Where two or more lens sheets 7 are located, it is preferable to locate them to have the aligned directions of the linearly aligned members thereof crossing each other in order to control the optical path in an efficient manner.

The light diffusion layer 6 serves to, for example, equalize the light emission by scattering light emitted from the optical element 10 while maintaining the polarization thereof, or limit the irregular surface structure of the lens sheet 7 from being visualized so as to improve the visual recognition characteristics and the like.

The light diffusion layer 6 preferably has excellent transmittivity of light and polarization-maintaining characteristics for the emitted light as in the case of the lens sheet 7. Therefore, the light diffusion layer 6 is preferably formed by using a resin having small birefringence characteristics such as those exemplified for the lens sheet 7. For example, it is possible to form the light diffusion layer 6 having the polarization-maintaining characteristics by dispersedly distributing transparent particles in the resin, or providing a surface with a resin layer having a minute irregular surface structure.

As transparent particles to be dispersedly distributed in the resin, it can be cited inorganic fine particles made of silica, glass, alumina, titanica zirconia, tin oxide, indium oxide, cadmium oxide, antimony oxide or the like that may have electric conductivity, or organic fine particles made of an acrylic polymer, or a crosslinked or uncrosslinked polymer such as polyacrylonitrile, polyester or epoxy resin, melamine resin, urethane resin, polycarbonate, polystyrene or silicone resin, benzoguanamine or melamine-benzoguanamine condensate, or benzoguanamine-formaldehyde condensate.

One or more materials are used to make the transparent particles, and the particle size is preferably 1 μm to 2 μm in diameter to have an appropriate light diffusing capability, equal diffusion characteristics or the like. While the particle shape is optionally determined, a (true) spherical shape, its secondary aggregate or the like is generally used. Particularly, it is preferable to use transparent particles having a refractive index ratio of 0.9 to 1.1 to the resin in view of the polarization-maintaining characteristics.

The light diffusion layer 6, which contains the aforesaid transparent particles, can be formed by an appropriate method, such as by incorporating transparent particles into a molten resin solution and extruding it into a sheet or the like, by blending transparent particles into a resin solution or monomer and then casting the solution into a sheet or the like, and optionally subjecting it to polymerization according to needs and circumstances, by coating a resin solution containing transparent particles on a predetermined surface or a substrate film having the polarization-maintaining characteristics, or by any other known method.

On the other hand, the light diffusion layer 6 having minute irregular surface structures can be formed by an appropriate method, for example, by roughening the surface of a sheet made of a resin by buffing such as sandblasting or embossing finish, or by forming a layer of a light passing material on the surface of the resin sheet so as to provide protrusions thereon. Of these conventional methods, it is not preferable to employ a method of forming protrusions having a large refractive index difference to the resin, such as air bubbles or titanium oxide fine particles because a minute irregular surface structure formed by this method facilitates elimination of the polarization.

The minute irregular surface of the light diffusion layer 6 preferably has a surface roughness higher than the wavelength of the incident light but not higher than 100 μm in view of light diffusing characteristics, its equal diffusion characteristics or the like, and preferably does not have a specific pattern repeatedly appeared.

For forming the light diffusion layer 6 of the above types that contains transparent particles or has a minute irregular surface, it is preferable to limit increase in phase difference due to photoelasticity or orientation, particularly in a base layer made of the aforesaid resin in view of the polarization-maintaining characteristics.

The light diffusion layer 6 may be arranged in the form of an independent layer having such as a plate-like shape, or a secondary layer integrally formed with the lens sheet 7 in tight contact with each other. Where the light diffusion layer 6 is located adjacent to the optical element 10, it is preferable to locate them to have a clearance therebetween in the same manner as in the case of the lens sheet 7. Where two or more light diffusion layers 6 are provided, they may be of the same type as each other or different types from each other, while it is preferable for them to exhibit the polarization-maintaining characteristics throughout the entirety thereof. The wavelength cut filter as mentioned above is used for the purpose of preventing direct light from the excitation light source 9 from entering a liquid crystal display element, which is illuminated by the polarized-light-emitting-surface light soured of this embodiment. Particularly, in a case where excitation light used is ultraviolet light, a wavelength cut filter is preferably used in order to prevent deterioration of liquid crystal, polarizing plate or the like due to ultraviolet light. The wavelength cut filter may also be used for the purpose of eliminating visible light rays of unnecessary wavelength.

As the wavelength cut filter, it can be cited a film that is made by dispersing a material, which absorbs a target wavelength (e.g., an UV absorber of an acetylsalicylic acid compound, benzophenol compound, benzotriazole compound, cyanoacrylate compound, or nickel complex salt compound), in a resin capable of allowing visible light to pass therethrough recoating the material on the resin, a film made of a light passing film with a cholesteric liquid crystal layer formed thereon, a film that reflects light of a target wavelength through the reflection of a dielectric multilayer film, or the like. It is also possible to incorporate an UV absorber or the like in the optical element 10 or any other optical part, enabling the optical element 10 or any other optical part itself to serve to cut wavelength.

The retardation film as mentioned above is used for the purpose of converting linearly polarized light emitted from the optical element 10 to light in a given polarized state. For example, it is possible to convert linearly polarized light into circular polarized light by the arrangement that a quarter-wave plate as a retardation film is located to have a slow axis oriented 45° C. to the linearly polarized light emitted from the optical element 10, or rotate the polarization axis of the linearly polarized light emitted from the optical element 10 by using a half wave plate.

As the retardation film, it can be cited a film comprising a polymer film, which is generally used for compensating liquid crystal cells, a film comprising a light passing film with an oriented liquid crystal polymer or the like attached thereon, or the like.

Each of the lens sheet 7, the light diffusion layer 6, the wavelength cut filter and the like may be used in a separate layer, or some or all of them may make up a single film in laminate structure. Also, they can be tightly bonded via an adhesive layer or the like to a liquid crystal display element to be located thereon. However, for the lens sheet 7 having an irregular surface structure or the light diffusion layer 6 having a minute irregular surface structure, it is preferable to locate them with a distance to the liquid crystal display element.

It is also preferable to locate each of the lens sheet 7, the light diffusion layer 6, the wavelength cut filter and the like with a distance to the optical element 10 so as to prevent any influences on control of the condition applicable to the critical angle and hence retrieve polarized light in an efficient manner.

The optical element 10 of this embodiment and the polarized-light-emitting surface light source, to which the optical element 10 is applied, is capable of allowing light, which results from excitation by incident light from the excitation light source 9, to be emitted from the optical element 10 in the form of linearly polarized light, and controlling the polarization direction (the plane of vibration). Therefore, they are applicable in various devices or to various fields, such as a liquid crystal display that utilizes linearly polarized light.

Now, examples and comparative examples will be provided in order to further distinguish the features of the present invention.

EXAMPLE 1

By using 20 wt. %6 of a dichloromethane solution, in which 950 wt. parts of a norbornene resin (ARTON manufactured by JSR Corporation, having a glass transition temperature of 182° C.), 50 wt. parts of a liquid crystal polymer expressed in the following chemical formula (having a glass transition temperature of 80° C. and showing a nematic liquid crystal phase in the temperature range of 100° C. to 290° C.) and 2 wt. parts of 3-(2-benzothiazolyl)-1-diethylaminocoumarin (coumarin 540) were dissolved, a film having a thickness of 100 μm was formed by casting. This film was stretched at 180° C. to 300% extension and then rapidly cooled. Thus, an optical element has been formed.

EXAMPLE 2

In place of coumarin, fine powder of tris(8-quinolinolato) aluminum was dispersed in the solution. Except for this replacement, an optical element of this example was prepared in the same manner as the Example 1. The refractive index differences $\Delta n1$, $\Delta n2$ and $\Delta n3$ were all the same as those of the Example 1.

EXAMPLE 3

After bonding the optical element of the Example 1 to a glass plate (thickness: 3 mm) by using acrylic adhesive, a silver-deposited mirror-finished reflective sheet, which was prepared by vapor deposition of silver on a polyethylene terephthalate sheet, was located on the side opposite to side on which the glass plate was bonded, to prepare a multilayer member, and a blacklight cold cathode fluorescent lamp was fixed on any one of the opposite sides of the multilayer member by lamp reflector of a mirror-finished reflective sheet. Thus, a polarized-light-emitting surface light source was formed.

COMPARATIVE EXAMPLE

An optical element was formed in the same manner as the Example 1 except that no liquid crystal polymer was incorporated.

(Evaluation)

Green luminescence having a center wavelength of 505 nm and that having a center wavelength of 525 nm were respectively observed upon irradiation of the optical elements of the Examples 1 and 2 and Comparative Example with a blacklight fluorescent lamp. The output intensities of the respective components of linearly polarized light in the

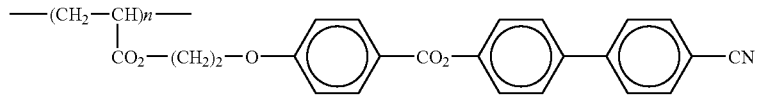

The optical element thus formed was constituted by a transparent film made of a norbornene resin and a liquid crystal polymer dispersed therein as domains of almost the same shape elongated in the stretch direction and had a refractive index difference $\Delta n1$ of 0.23 and refractive index differences $\Delta n2$ and $\Delta n3$ of 0.029. For measuring of these refractive index differences, an Abbe refractometer was used. That is, the refractive index difference of an optical element, in which a norbornene resin was solely stretched under the same condition as above, and the refractive index difference of an optical element, in which the aforesaid liquid crystal polymer was solely coated on an oriented film, then oriented and fixed, were measured. The differences between the measured refractive indexes were respectively calculated as $\Delta n1$, $\Delta n2$ and $\Delta n3$. Coumarin was present in a molten state in the norbornene resin. The average particle diameter of minute regions (domains of the liquid crystal polymer) was measured by coloring through polarizing microscope observation on the basis of the phase difference. As a result, it has been found that the length in the $\Delta n1$ direction was about 6 μm.

$\Delta n1$ direction and the $\Delta n2$ direction of emitted light as measured by using a commercially available polarizer (a 99.99 degree of polarization) were substantially 1:1 in the optical element of the Comparative Example (a stretched direction was designated as the $\Delta n1$ direction) with no linearly polarized light emitted, 6:1 in the optical element of the Example 1, and 4:1 in the optical element of the Example 2.

It has been found that, in the polarized-light-emitting surface light source of the Example 3, linearly polarized light of the optical element in the $\Delta n1$ direction is emitted in plane.

This specification is by no means intended to restrict the present invention to the preferred embodiments set forth therein. Various modifications to the optical element, polarized-light-emitting surface light source and display unit using the optical element, as described herein, may be made by those skilled in the art without departing from the spirit and scope of the present invention as defined in the appended claims.

What is claimed is:

1. An optical element having a plate-like shape, which comprises a light-transmitting resin and minute regions, said minute regions being dispersedly distributed in said light-transmitting resin and having a birefringence different from said light-transmitting resin, wherein at least one of said light-transmitting resin and said minute regions contains at least one luminescent material;

wherein said at least one luminescent material is a fluorescent material that absorbs any one of ultraviolet light and visible light and emits visible light.

2. An optical element having a plate-like shape, which comprises a light-transmitting resin and minute regions, said minute regions being dispersedly distributed in said light-transmitting resin and having a birefringence different from said light-transmitting resin, wherein at least one of said light-transmitting resin and said minute regions contains at least one luminescent material;

wherein said at least one luminescent material is a phosphorescent material that absorbs any one of ultraviolet light and visible light and emits visible phosphorescence.

3. The optical element according to claim 1, wherein said minute regions are made of any one of a liquid crystal material, a material in glass state that is formed by fixing a liquid crystal phase upon cooling, and a material that is formed by crosslinking and fixing a liquid crystal phase of a liquid crystal monomer upon irradiation of energy rays.

4. The optical element according to claim 1, wherein said minute regions are made of a liquid crystal polymer that has a glass transition temperature of 50 t or higher and exhibits a nematic liquid crystal phase at a temperature lower than the glass transition temperature of the light-transmitting resin.

5. The optical element according to claim 1, wherein the following expressions (1)-(3) are established for refractive index difference between said minute regions and said light-transmitting resin:

$$0.03 \leq \Delta n1 \leq 0.5 \quad (1)$$

$$0 \leq \Delta n2 \leq 0.03 \quad (2)$$

$$0 \leq \Delta n3 \leq 0.03 \quad (3)$$

where, $\Delta n1$: refractive index difference in an axial direction of the minute regions, along which a maximum refractive index difference occurs $\Delta n2$: refractive index difference in an axial direction orthogonal to the axial direction along which the maximum refractive index difference occurs $\Delta n3$: refractive index difference in an axial direction orthogonal to the axial direction along which the maximum refractive index difference occurs.

6. A polarized-light-emitting surface light source comprising an optical element having a plate-like shape and a light source that emits light of a wavelength that is capable of exciting a luminescent material contained in said optical element, said optical element comprising a light-transmitting resin and minute regions, said minute regions being dispersedly distributed in said light-transmitting resin and having a birefringence different from said light-transmitting resin, and at least one of said light-transmitting resin and said minute regions contains at least one luminescent material;

wherein said at least one luminescent material is a fluorescent material that absorbs any one of ultraviolet light and visible light and emits visible light.

7. The polarized-light-emitting surface light source according to claim 6, further comprising a light guide member for guiding light emitted from said light source to said optical element, said light guide member being made of a light passing material.

8. The polarized-light-emitting surface light source according to claim 6 comprising an electroluminescence element.

9. A display unit comprising the polarized-light-emitting surface light source according to claim 6.

* * * * *